(12) United States Patent
Stuckert et al.

(10) Patent No.: US 10,799,827 B2
(45) Date of Patent: Oct. 13, 2020

(54) MID-RANGE PURITY OXYGEN BY ADSORPTION

(71) Applicants: Nicholas R. Stuckert, Grand Island, NY (US); Yang Luo, Amherst, NY (US)

(72) Inventors: Nicholas R. Stuckert, Grand Island, NY (US); Yang Luo, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 243 days.

(21) Appl. No.: 15/948,153

(22) Filed: Apr. 9, 2018

(65) Prior Publication Data

US 2018/0290099 A1 Oct. 11, 2018

Related U.S. Application Data

(60) Provisional application No. 62/484,149, filed on Apr. 11, 2017.

(51) Int. Cl.
*B01D 53/047* (2006.01)
*B01J 20/18* (2006.01)
*B01D 53/04* (2006.01)

(52) U.S. Cl.
CPC ..... *B01D 53/0476* (2013.01); *B01D 53/0423* (2013.01); *B01D 53/0473* (2013.01); *B01J 20/18* (2013.01); *B01D 2253/108* (2013.01); *B01D 2253/1085* (2013.01); *B01D 2256/12* (2013.01); *B01D 2257/102* (2013.01); *B01D 2259/401* (2013.01); *B01D 2259/402* (2013.01); *B01D 2259/4002* (2013.01);
(Continued)

(58) Field of Classification Search
CPC .. B01D 53/04; B01D 53/047; B01D 53/0423; B01D 53/0473; B01D 53/0476; B01D 2253/108; B01D 2253/1085; B01D 2256/12; B01D 2257/102; B01D 2259/40007; B01D 2259/40037; B01D 2259/40043; B01D 2259/40052; B01D 2259/40013; B01D 2259/4002; B01D 2259/40024; B01D 2259/40035; B01D 2259/401; B01D 2259/402; B01J 20/18
USPC .................................. 95/96–98, 103, 130
See application file for complete search history.

(56) References Cited

U.S. PATENT DOCUMENTS 4,913,709 A * 4/1990 Kumar ............... B01D 53/0476
 95/100
5,122,164 A 6/1992 Hirooka et al.
(Continued)

FOREIGN PATENT DOCUMENTS

WO 2008/005492 A1 1/2008

*Primary Examiner* — Frank M Lawrence, Jr.
(74) *Attorney, Agent, or Firm* — Ralph J. Mancini (57) ABSTRACT

The present invention relates to a process cycle that allows for the stable production of mid-range purity oxygen from air, using traditional system designs. Typical cycles have a limited production benefit when generating $O_2$ at lower than 90% purity, however they suffer a production loss at higher purity. The process cycles of the invention are capable of producing significantly more contained $O_2$ at a lower purity. In addition to enhanced production capacity, lower power consumed per mass of product and more stable product purity and flow are realized by the process of the invention compared to traditional alternatives.

22 Claims, 6 Drawing Sheets

(52) U.S. Cl.
 CPC ............ *B01D 2259/40007* (2013.01); *B01D 2259/40013* (2013.01); *B01D 2259/40024* (2013.01); *B01D 2259/40035* (2013.01); *B01D 2259/40037* (2013.01); *B01D 2259/40043* (2013.01); *B01D 2259/40052* (2013.01); *B01D 2259/40075* (2013.01)

(56) References Cited

U.S. PATENT DOCUMENTS

| | | | |
|---|---|---|---|
| 5,702,504 A | 12/1997 | Schaub et al. | |
| 6,277,174 B1 | 8/2001 | Neu et al. | |
| 6,428,607 B1* | 8/2002 | Xu .................... | B01D 53/0476 95/101 |
| 6,500,234 B1 | 12/2002 | Ackley et al. | |
| 6,506,234 B1 | 1/2003 | Ackley et al. | |
| 6,527,830 B1* | 3/2003 | Neu ................... | B01D 53/0476 95/100 |
| 7,396,387 B2 | 7/2008 | Baksh et al. | |
| 7,785,405 B2 | 8/2010 | Manning et al. | |
| 9,089,810 B2 | 7/2015 | Belanger et al. | |
| 2005/0257685 A1* | 11/2005 | Baksh ............... | B01D 53/047 95/96 |
| 2007/0283807 A1* | 12/2007 | Whitley ............. | C01B 13/0259 95/96 |

\* cited by examiner

*Note field data was unable to obtain optimized production at lower purities due to equalization valve restrictions.

MID-RANGE PURITY OXYGEN BY ADSORPTION

RELATED APPLICATIONS

This application claims the benefit of U.S. Provisional Application Ser. No. 62/484,149, filed on Apr. 11, 2017, which is incorporated herein by reference.

FIELD OF THE INVENTION

A novel process cycle and plant design for production of lower purity $O_2$ from a VPSA/VSA/PSA system. Typical plants target >90% $O_2$ purity. According to the present invention, adsorbent utilization is maximized by making careful use of the purge gas, which enables a lower pressure ratio and a lower average pressure. These benefits in conjunction with other modifications enable a significant production benefit at $O_2$ purities <85% but greater than 50%.

BACKGROUND OF THE INVENTION

Typically the purity for large scale VPSA plants is >90%. Mid-range purity oxygen production is not described in the literature. Most patents do not specifically restrict production to these ranges, but under 90% purity, the production and purity is difficult to hold steady and the benefits of the cycle designs are lost.

U.S. Pat. No. 6,500,234 to Ackley et al. describes processes utilizing advanced adsorbents with high intrinsic diffusivities relative to conventional adsorbents. Increased oxygen product recovery was demonstrated by increasing the rates of adsorption/desorption to create higher nitrogen mass transfer coefficients at a fixed pressure ratio. This concept was then applied to achieve very short cycles (e.g., greater than 10 s) and very low bed size factors (BSF) while affecting only a minimal decrease in product recovery. Instead the claim here is to increase the size of the beds to extend cycle time and increase the equalization rate to reduce blow down time which effectively provides the majority of the production benefit without the increased cost and complexity.

U.S. Pat. No. 5,122,164 to Hirooka et al. describes 6, 8 and 10-step vacuum pressure swing adsorption (VPSA) processes for separating air to produce oxygen. The main emphasis of this patent is the cycle configuration and detailed operation of the various cycle steps to improve yield and productivity, but targeted for >90% purity cycles. Additional steps such as product pressurization and split equalization helped increase production for high purity applications >90%. The teachings here will demonstrate these additions actually play a negative role for mid-range purity.

U.S. Pat. No. 7,396,387 to Baksh et al. describes a multi-bed adsorption system to maximize utilization of the blower production. The proposal is a multi-bed system that increases recovery and allows the blowers to always stay on. This increases system cost relative to the incremental cost for larger blowers.

U.S. Pat. No. 5,702,504 to Schaub et al. is currently one of the most advanced cycles in use industrially for $O_2$ VPSA plants. The advance of the overlapping equalization and evacuation significantly diminished the limitations of industrial vacuum blowers and also increased the working capacity of the adsorbents by providing a lower overall bottom pressure to the bed. The cycle proposed in this patent is the basis for the advances presented here.

Some applications do not require 90% or greater purity, and could benefit from lower cost $O_2$ at a lower purity. Accordingly, it is an object of the invention to provide a process cycle that allows for the stable production of mid-range purity oxygen from air, using traditional system designs. Typical cycles have a limited production benefit when generating $O_2$ at lower than 90% purity, however they suffer a production loss at higher purity. Blending in air with 90% $O_2$ is an option; however this adds significant capital cost and complexity.

SUMMARY OF THE INVENTION

The present invention relates to a process cycle that allows for the stable production of mid-range purity oxygen from air, using traditional system designs. Typical cycles have a limited production benefit when generating $O_2$ at lower than 90% purity, however they suffer a production loss at higher purity. The process cycles of the invention are capable of producing significantly more contained $O_2$ at a lower purity. In addition to enhanced production capacity, lower power consumed per mass of product and more stable product purity and flow are realized by the process of the invention compared to traditional alternatives.

DETAILED DESCRIPTION OF THE INVENTION

The present invention of the new process cycle for producing mid-range purity oxygen by adsorption is applicable to various adsorption vessels and compression configurations used for vacuum pressure swing adsorption system.

In some applications lower purity oxygen is tolerated; however with traditional cycles, the production benefits are not sufficient to compete with blending in air after higher purity production. According to the present invention, adsorbent utilization is maximized by making careful use of the purge gas, which enables a lower pressure ratio and a lower average pressure. These benefits in conjunction with other modifications enable a significant production benefit at $O_2$ purities <85% but greater than 50%.

The invention is a process cycle for oxygen production from a PSA/VSA/VPSA process which uses an adsorbent whose adsorption preference for nitrogen over oxygen allows for production of a higher purity oxygen product stream. The primary component of the feed stream is air. The process cycle of the invention allows for the stable production of mid-range purity oxygen from air, using a modification to traditional cycles and traditional system designs.

Oxygen purity is a main differentiating factor of the invention, along with enhanced production capacity, lower power consumed per mass of product and more stable product purity and flow. Mid-range oxygen purity can range from about 50% up to about 90%, in another embodiment from about 60% to about 85%; and in yet another embodiment from about 70-80%. A challenge of producing this intermediate range of oxygen is balancing the line between no mass transfer zone, as in the 30-60% purity cases, and having a sharp mass transfer zone, that reduces production capacity of the adsorbent. Both extremes work well primarily because after a mid-point around 40-50%, systems will tend toward low purity or high purity with traditional cycles. There is substantial difficulty in balancing production purity, maximized in the 60-75% range. To understand the issues, extensive modeling was done to show that proper balancing can be done with a modification of the purge step and an increase in the rate of equalization. These levers provide control to increase the purge purity which directly causes the system to act in a manner similarly to the >90% purity cases.

The process cycles of the invention allow for the production of a target purity of 50-90% $O_2$ with lower purity and flow fluctuations, while at the same time reducing the strain on the blowers, thereby increasing life expectancy and reducing the maintenance thereof. The cycles of the invention also allow stabilized purity and production at a mid-range purity which has typically not been possible. Additionally with a decreased pressure ratio, power consumption can be diverted toward more bed feed, further increasing total plant production. The lower pressure ratio additionally decreases the strain on the blowers and piping, it also mitigates leak and sieve contamination risks. The free air option allows additional plant feed air at the lowest pressure feed time of the cycle. This free air is also at ambient temperature and reduces the average inlet feed temperature. Subsequently the vacuum blower is more productive due to the lower inlet temperature.

Another advantage is the similarity to the current product line, which allows a deviation without incurring significant design costs. Reduced power consumption due to a lower pressure ratio is also a significant advantage. Essentially for the same plant power and same plant capital, production can be increased at least 10% and up to 40% with minor adjustments to the base plant design.

For compression system configurations, at least one adsorbent bed is cyclically pressurized by at least one feed compressor and evacuated by at least one vacuum compressor. One or more of the feed compressors or the vacuum compressors may be a centrifugal compressor driven by an associated high speed permanent magnet motor designed for variable speed operation to satisfy the pressure swing adsorption cyclic operation requirement.

Furthermore, the pressure swing adsorption system has at least one adsorption bed that may be cyclically pressurized by one or more feed centrifugal compressor driven by associated high-speed permanent magnet variable speed motor, and evacuated by one or more centrifugal compressors driven by an associated high-speed permanent magnet variable speed motor.

In embodiments where the compressor that is not a centrifugal compressor, rotary-lobe blower driven by induction motor can be utilized.

Centrifugal feed and/or vacuum compressors driven by variable-speed controlled high-speed permanent magnet motors allow for an order of magnitude energy efficiency improvement over positive displacement rotary-lobe blower driven by the conventional induction motor/gearbox due to the higher machine efficiency and elimination of gearbox and lube oil system. These variable speed centrifugal compressors will need to be designed and controlled to follow the cyclic pressure swing adsorption process to achieve the smooth machine operation and design efficiency as taught by U.S. Pat. No. 7,785,405B to Manning et al.

To maximize the efficiency of the variable-speed centrifugal compressors, pressure swing adsorption process steps and cycle time should be designed to be greater than the ratio of the change in inertia from the acceleration and deceleration conditions. Based on the teaching from U.S. Pat. No. 9,089,810B2 to Belanger et al, the centrifugal compressors are ideally used for vacuum pressure swing process with the cycle time at least 27 sec or longer to minimize the inertia loss.

The preferred cycle time for producing mid-range purity oxygen by adsorption is ~33.75 sec for the new 14 steps process cycle, and 33.5 sec for the new 12 steps process cycle. Both are well within the cycle time range which the inertia loss from the variable speed centrifugal compressor is minimized. Therefore, the higher machine efficiency can be translated into the overall pressure swing process. Furthermore, longer process cycle time is more favored for mid-purity oxygen process cycle vs high purity process cycle due to fact that mass transfer zone can be broadened in comparison to the high purity cycle to save compression power.

Figure 1:
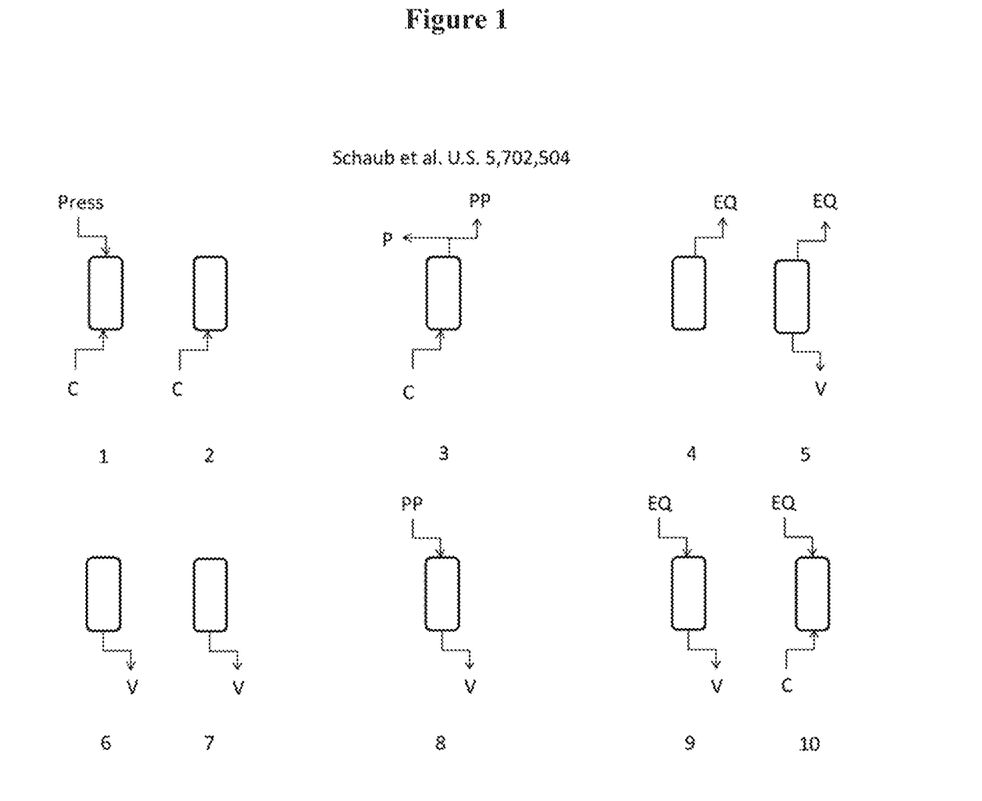
FIG. 1 illustrates the cycle of U.S. Pat. No. 5,702,504 to Schaub et al.

For the basis of the modifications, the cycle from the Schaub et al. U.S. Pat. No. 5,702,504 patent is presented in FIG. 1:
C—Compressor/pressurization
V—Vacuum/evacuate
AI—Ambient Inlet
PPG—Provide purge
EQDN—Equalize down
EQUP—Equalize up
P—Product make
  The cycle of FIG. 2 is:
  1) Compressor feed (C), with blower and product pressurization
  2) Compressor feed (C), with blower
  3) Compressor feed (C), product make and provide purge (PPG)
  4) Equalize down (EQDN)
  5) Equalize down (EQDN) and Evacuate (V)
  6) Evacuate (V)
  7) Evacuate (V)
  8) Evacuate (V) and receive purge (PPG)
  9) Evacuate (V) and equalize up (EQUP)
  10) Equalize up (EQUP) and Compressor feed (C)
The cycles of the invention offer significant improvements over the cycle of Schaub for the production of mid-range purity oxygen.

Figure 2:
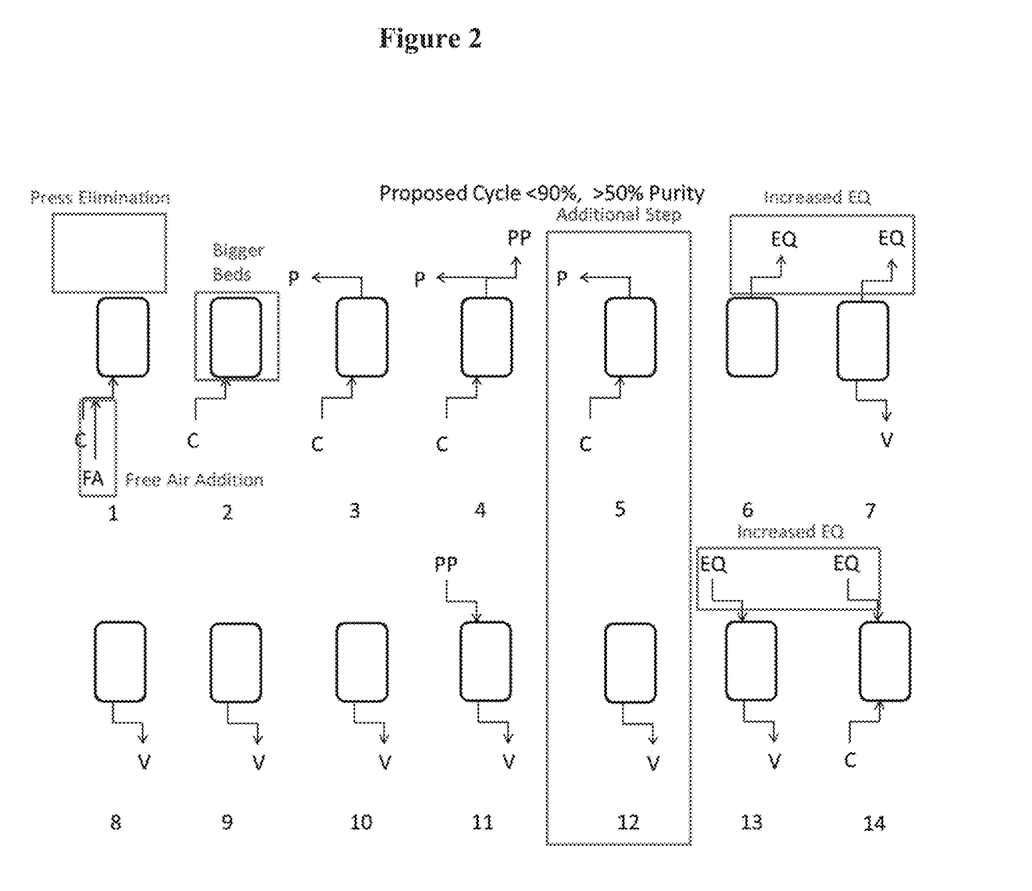
FIG. 2 depicts the 14-step cycle chart of the invention.
Figure 3:
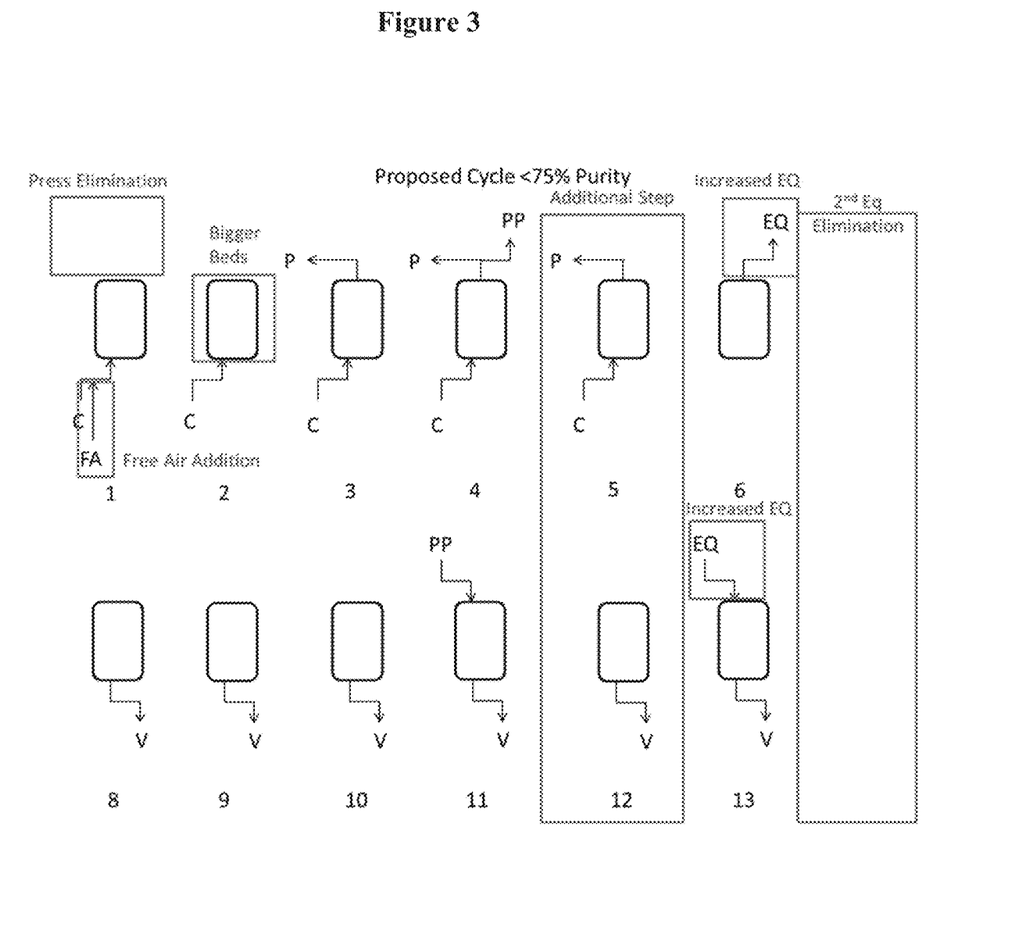
FIG. 3 shows the 12-step cycle chart in of the invention.

In one embodiment the invention relates to an adsorption process for the production of mid-range oxygen having a purity of from about 75% to about 90%, in another embodiment from about 75% to about 85%, and in another embodiment from about 75% to about 80%, wherein said process comprises a 14 step cycle following the cycle chart illustrated by FIG. 2. The abbreviations in the figures have the following meanings:

C—Compressor/pressurization
V—Vacuum/evacuate
AI—Ambient Inlet
PPG—Provide purge
EQDN—Equalize down
EQUP—Equalize up
P—Product make The cycle of FIG. 2 is:
1) Compressor feed (C), with blower and ambient inlet (AI)—1.625 s
2) Compressor feed (C), with blower—5.5 s
3) Compressor feed (C), and product make—5.5 s
4) Compressor feed (C), product make and provide purge (PPG)—1.5 s
5) Compressor feed (C), and product make—1.5 s
6) Equalize down (EQDN)—0.75 s
7) Equalize down (EQDN) and Evacuate (V)—0.5 s
8) Evacuate (V)—1.625 s
9) Evacuate (V)—5.5 s
10) Evacuate (V)—5.5 s
11) Evacuate (V) and receive purge (PPG)—1.5 s
12) Evacuate (V)—1.5 s
13) Evacuate (V) and equalize up (EQUP)—0.75 s
14) Equalize up (EQUP) and Compressor feed (C)—0.5 s In another embodiment the invention relates to an adsorption process for the production of mid-range oxygen having a purity less than or equal to 75% wherein said process comprises a 12 step cycle following the cycle chart in FIG. 3. In this embodiment the cycle of the invention is:
1) Compressor feed (C), with blower and ambient inlet (AI)—1.625 s
2) Compressor feed (C), with blower—5.5 s
3) Compressor feed (C), and product make—5.5 s
4) Compressor feed (C), product make and provide purge (PPG)—1.5 s
5) Compressor feed (C), and product make—1.5 s
6) Equalize down (EQ)—1.0 s
7) Evacuate (V)—1.625 s
8) Evacuate (V)—5.5 s
9) Evacuate (V)—5.5 s
10) Evacuate (V) and receive purge—1.5 s
11) Evacuate (V)—1.5 s
12) Evacuate (V) and equalize up (EQ)—1.0 s The major differences between the cycles of the invention and previous cycles are charted below:

| U.S. Pat. No. 5,702,504 to Schaub et al. | 50-85% purity | 50-85% purity with air feed | 50-75% purity | 50-75% purity with air feed |
|---|---|---|---|---|
| Step 1 Raising pressure feed with overlap product pressurization | | | | |
| | | Step 1 Raising pressure feed with ambient pressurization | | Step 1 Raising pressure feed with ambient pressurization |
| Step 2 Rising pressure feed | Step 1 Rising pressure feed | Step 2 Rising pressure feed | Step 1 Rising pressure feed | Step 2 Rising pressure feed |
| Step 3 Constant pressure feed and product make and provide purge | Step 2 Constant pressure feed and product make and provide purge | Step 3 Constant pressure feed and product make and provide purge | Step 2 Constant pressure feed and product make and provide purge | Step 3 Constant pressure feed and product make and provide purge |
| | Step 3 Constant pressure feed and product make | Step 4 Constant pressure feed and product make | Step 3 Constant pressure feed and product make | Step 4 Constant pressure feed and product make |
| Step 4 Falling pressure equalization, 2 s | Step 4 Falling pressure equalization (<0.75 s) | Step 5 Falling pressure equalization (<0.75 s) | Step 4 Falling pressure equalization (<1 s) | Step 5 Falling pressure equalization (<1 s) |
| Step 5 Falling pressure evacuation with overlap equalization, 2 s | Step 5 Falling pressure evacuation with overlap equalization (<0.5 s) | Step 6 Falling pressure evacuation with overlap equalization (<0.5 s) | | |
| Step 6 Falling pressure evacuation | | Step 7 Falling pressure evacuation | | Step 6 Falling pressure evacuation |
| Step 7 Falling pressure evacuation | Step 6 Falling pressure evacuation | Step 8 Falling pressure evacuation | Step 5 Falling pressure evacuation | Step 7 Falling pressure evacuation |
| Step 8 Oxygen purge | Step 7 Oxygen purge | Step 9 Oxygen purge | Step 6 Oxygen purge | Step 8 Oxygen purge |
| | Step 8 Falling pressure evacuation | Step 10 Falling pressure evacuation | Step 7 Falling pressure evacuation | Step 9 Falling pressure evacuation |
| Step 9 Raising pressure evacuation with overlap equalization | Step 9 Raising pressure evacuation with overlap equalization | Step 11 Raising pressure evacuation with overlap equalization | Step 8 Raising pressure feed with overlap equalization | Step 10 Raising pressure feed with overlap equalization |

| U.S. Pat. No. 5,702,504 to Schaub et al. | 50-85% purity | 50-85% purity with air feed | 50-75% purity | 50-75% purity with air feed |
|---|---|---|---|---|
| Step 10 Raising pressure feed with overlap equalization | Step 10 Raising pressure feed with overlap equalization | Step 12 Raising pressure feed with overlap equalization | | |

In the above table, each row represents a unique process step. The combinations of the different steps and the timing for the equalizations steps demonstrate the new attributes of the cycles of the invention.

Figure 5:
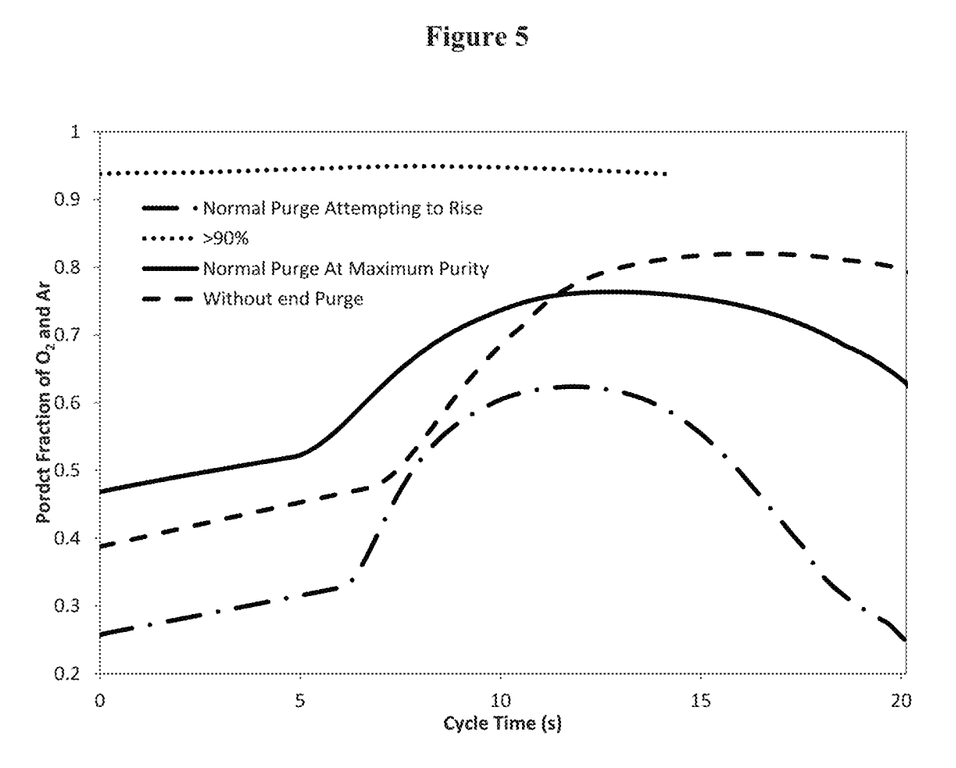
FIG. 5 illustrates a compilation of the product purity obtained at the product header in the modeling environment for the different cases of: >90% production, a Schaub cycle at 80% product purity, a Schaub cycle starting at <80% purity attempting to rise to 80% purity and the cycle proposed here at 80% purity demonstrating the rising tendency of the end of the product make step and the lowering tendency of the start of the product make step.

I. Purge Modification (step 3 and step 8 of the 50-85% purity cycle). Contrary to previous teachings that maintain purge until stopping product make, the present invention stops purge before stopping product make. In the step 3 "Constant pressure feed and product make and provide purge" of typical cycles, here we are ending purge early by isolating the valve connecting the $1^{st}$ and $2^{nd}$ beds while continuing to produce product into the surge tank. This additional step lasts from 0.25 to 4 seconds in a typical cycle. This is novel/surprising/unique to low purity due to the negative effects of vacuum production loss by not purging. The benefit here is then really a tradeoff between the cleaning potential of the product gas, the loss of the product, and the gain/loss in vacuum production. The purity trace of the product gas shows us that at a certain point during the product production, the purity begins to decrease rapidly. This is in contrast to the higher purity cycle where the purity is largely the same across the entire product make step. As seen in FIG. 5, during product production at an average of 90% purity the variation in product purity is typically less than 2% (i.e. from 88% to 92%). In low purity cycles shown in FIG. 5, for an average purity of 70%, the product purity can vary from a low of 50% to a high of 85%. If we apply this step to a plant that performs at 90% purity, we will see a production decrease. So here we are teaching that only at product purity <90% does this step help performance instead of hurt. In addition to higher production and bed cleaning, this also helps stability of the plant production as explained later.

II. Free Air (step 1 for 50-85% and 50-75% cycles with air feed)—Free air ambient feed is unique to a VSA/VPSA and is particularly useful in conjunction with the purge modification as it allows the significantly higher productivity from a vacuum blower. With the above purge modification, the plant is subsequently feed air limited. This new ambient air feed step allows us to use our product line in its current form and produce more from the plant but utilizing the higher vacuum productivity to draw-in extra feed air from the environment. Without this step, plants would require different vacuum and feed blower sizes for different product purities. Thus the major benefit here is an engineering/cost savings one and a flexibility benefit allowing our plants to satisfy customer requirements in the event the customer needs higher oxygen production at a lower purity.

III. Second Equalization Elimination (50-75% purity cycles). This is a modification to previous teachings, which introduced overlapping vacuum and feed blower use to equalization steps. The focus was to maintain the Mass Transfer ("MT") front as sharp as possible, but negatively increased the energy consumption of the blowers. Here we introduce a deviation from the traditional equalization in the opposite direction, i.e. we are allowing our mass transfer front to broaden, while decreasing the energy consumption of our blowers. This step was originally introduced as a method to increase plant production. However when applied to modern materials for low purity production, this step can be beneficially eliminated. Essentially a single equalization with an isolated product blower and an overlapping evacuation is sufficient to conserve the majority of the higher oxygen purity gas. Thus this is unique to low purity production, i.e. <90%.

IV. Product Pressurization Elimination (all cycles). With the same reasoning as the previous we also eliminate product pressurization. The "elimination of product pressurization", "without product pressurization", and/or "no product pressurization" is defined as a substantial reduction in the flow of gas from the surge tank to the adsorber bed. This can be characterized by the timing of the product make valve opening relating to the difference in pressures between the adsorber bed and the surge tank. The inflection point is when the difference between the surge tank and the bed is 0. If the product make valve opens less than 2 seconds before the inflection point, the amount of gas flowing from the surge tank to the adsorption bed is insignificant to the process and provides no benefit to low rate materials and no penalty to high rate materials. Therefore no product pressurization is defined as a cycle in which the product valve opens less than 2 seconds before the inflection point.

V. Faster Equalization (steps 4 and 5 of 50-85% purity and step 4 of 50-75% purity). In addition to the previous changes and enabled by the split equalization elimination change, we can counter intuitively increase the equalization rate. Normally this would cause a broadening of the MT zone. However in the case of mid-range purity, the MT zone is already broad and is not required to be sharp to maintain purity. Thus there are insignificant negative effects here. There is also a novel benefit in that due to the faster equalization, more equalization occurs to the lower pressure bed, which then causes the product purity profile to shift. The peak purity can then be controlled to the exact time of the ending of the purge step to significantly increase the fixed purity production of the plant. For timing of the equalization, historically 1.5-4 seconds have been named for each step (equalization and overlap equalization and evacuation). Here we claim less than 1.5 seconds is beneficial to the production of the plant with a target of from about 0.5 to 1.25 s total for all equalization steps when multiple steps are present.

The best mode of operation for this system combines identified process modifications into the two modified process cycles proposed, one for 50-85% $O_2$ product purity and one for 50-75% $O_2$ product purity.

In order to quantify and demonstrate the benefits, a dynamic partial differential mathematical system was constructed to simulate the performance. Using gPROMS© from Process Systems Enterprise Inc., an adsorbent bed model was constructed as well as a roots compressor and roots vacuum blower model. Gas voids, valves and piping pressure drops were simulated as were product tank dynamics. This model is now commercially available under the ProcessBuilder© platform. The model is a dynamic equation based model that uses measured data (isotherms, density, heat capacity, thermal conductivity, bead porosity, bed porosity, mass transfer coefficients, and etc.) to simulate the performance of a material in a process. For the process side we modeled the performance as if it was part of a real plant. The product draw rate of the plant, the size of the product surge tank, flow resistance of the valves, volume of interconnecting piping, and performance measurements of the feed and vacuum compressors, pressure drop across the filter housing and the aftercooler heat exchanger, void space of the vessels, bed volume of the vessels, atmospheric pressure, and atmospheric temperature were used to accurately simulate production benefits. The product draw rate was changed in order to control the product purity and the bed volume and void space was adjusted independently to determine the optimal size. Additionally a pilot scale system was built to demonstrate the benefits. This included a 40" transfer length bed with dimensions approximating those of an equivalent radial vessel, equalization header and valves, as well as feed header and valves, product header and valves and vacuum header and valves with a variable speed vacuum pump. LiX adsorbent from Zeochem LLC. was used to demonstrate the performance.

Starting from the cycles in the previously mentioned literature, we find that it is not beneficial to implement product pressurization at <85% or split equalization at <75% purity. As an example, this is in direct contradiction of the teachings of U.S. Pat. No. 5,122,164 to Hirooka and U.S. Pat. No. 5,702,504 to Schaub for >90% purity plant production. This is demonstrated in a modeling environment and further verified in a pilot system. Starting from the base Schaub cycle, the elimination of product pressurization increases production 1.4% and decrease plant energy consumption by 5%.

When designing plants the size of the adsorbent beds relative to the production required is an important design parameter. This parameter is the bed size factor (BSF) and is the total pounds of adsorbent divided by the production on the plant. A typical unit of measurement of the production is short tons of O2 produced per day, which is the purity of the product multiplied by the total product flow. When eliminating the second equalization step at with small beds (BSF<600 lbs/stpd) there is a production decrease of 0.5% and an energy consumption increase of 1.4% at a BSF of 550. For the same change with a large bed case (BSF>600 lbs/stpd) there is an increase in production of 1.5% and an energy consumption decrease of 1.4% at a BSF of 730.

In direct contradiction to previous teachings, there is no limit to the benefit of a shortened equalization step time. Previously equalization steps were timed to balance the effects of lost feed air with the slow rate of desorption of adsorbents and therefore spreading of the mass transfer front. In the moderate purity range, the mass transfer front of the bed is very small and in this range is almost entirely dependent on the purge purity, rather than the equalization purity or amount. Thus faster equalization is desirable to increase recovery through void space loss reduction and increase total bed feed by unload time minimization. Results demonstrate at 0.8% production increase and 0.7% energy consumption decrease with total equalization timing change from 4 seconds to 1.5 seconds. At times lower than 1.5 seconds, the benefit is dependent on the adsorption and desorption rate of the adsorbent. For slow adsorbents (MTC<20 s$^{-1}$) then 1.5 seconds is the peak. At MTC of 30 s$^{-1}$ 1.25 seconds gives peak production and at an MTC of 60 s$^{-1}$ 0.75 seconds gives peak production. When using higher rate adsorbents describe in Ackley patent, the lower equalization time for maximum production is outside the optimal equalization times found by Schaub et al.

In another change to the process, ambient feed air is introduced to take advantage of the low bed pressure relative to the ambient pressure at the end of equalization. Here the vent is placed between the blower and the bed, so while the blower is able to feed a constant volume of air, the ambient feed can amplify this volume until the bed reaches atmospheric pressure. This essentially gives an increase to blower performance without a significant cost increase and further enhances the feed temperature profile of the air. Rather than have a constant or slightly diminishing volume of air fed to the bed over time (which corresponds with rising temperature), an increase in the feed volume at lower pressure and therefore lower temperature, moderates the temperature of the adsorbent, increasing working capacity and also increasing vacuum production with a lower vacuum feed temperature. In the modeling environment, addition of a free air intake to the system allows for a production increase of 0.23% and a 0.25% decrease in energy consumption at 83% $O_2$ product purity. This step needs to be carefully controlled however, as leaving the valve open too long will inevitably cause a loss of feed gas through a reverse flow situation once the bed is pressurized.

Figure 4:
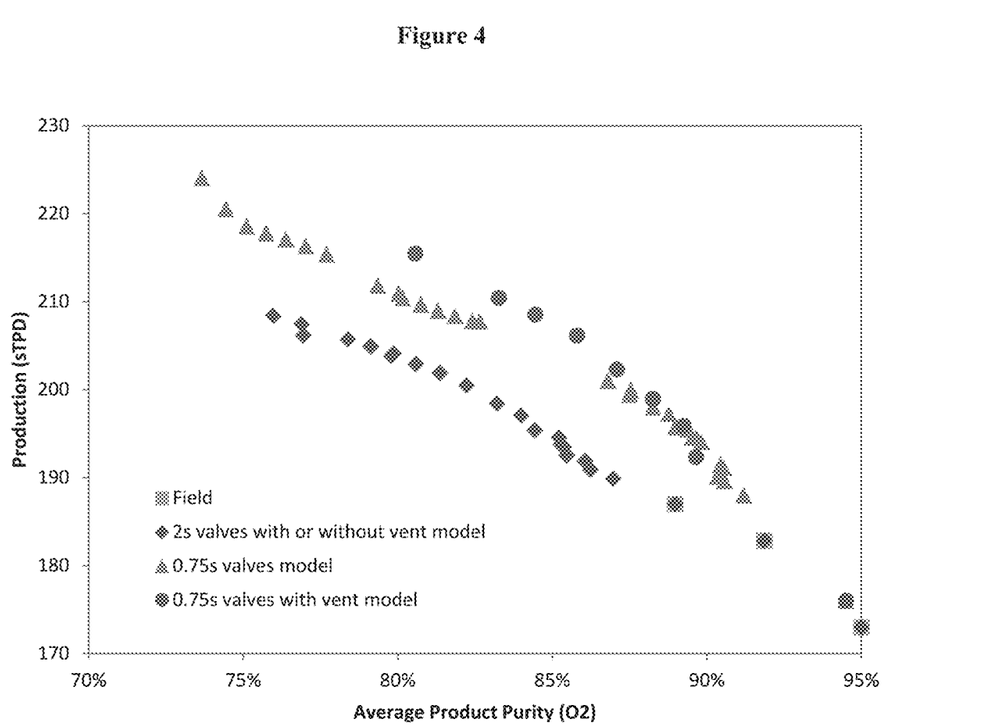
FIG. 4 illustrates the purity plot curve showing the benefit of venting after equalization and the effect of 0.75s valve timings compared with 2.0s valve timings.

In another change to the process, valves are cycled at the maximum possible speed rating from the manufacturer. Previously undocumented, the valve opening and closing speed of the feed and vacuum valves has a relatively small effect on high purity production (>93%). Typically the valves are cycled slowly in an effort to extend valve life and reduce maintenance. In a mid-range purity application, this can have a significant impact on the production of a plant. Below purities of 93% valve closing times of 0.75 s have up to a 7% increase in performance compared with valve closing times of 2 s as demonstrated in a modeling environment. With faster valve timing, another change to the process, ambient venting is also introduced via a check valve that bypasses the vacuum compressor. This valve allows gas to exit the vessel at a faster rate than provided by the vacuum compressor, and after equalization has occurred. This is opposed to the alternative option of allowing the bed to vent immediately after compression and during equalization. This check valve is most beneficial at high BSFs (>400 lbs/stpd) and high feed compressor to vacuum compressor ratios (where the feed compressor is >80% of the size of the vacuum compressor). A purity plot curve showing the benefit of venting after equalization is shown below, and the effect of 0.75 s valve timings compared with 2.0 s valve timings is shown in FIG. 4.

With a basic cycle, involving equalization and purge steps, we find that introduction of a step after the purge/product make step and only making product, while stopping the purge, increases the production of the plant and diminishes plant variability. The reason for this can be seen in a modeling environment. In the product purity trace for a 90% production plant, the purity varies only slightly during the production of a bed. For a moderate purity product, the purity varies as much as 20% over a few seconds of production, primarily while the plant is building purity. This causes the plant to take significantly longer to build purity than to lose purity, diminishing stability. Further the purity peaks during the mid-part of the step before it either levels off with low amounts of equalization or significantly decreases with higher amounts of equalization. By stopping the purge at the peak of product purity, we are maximizing the impact of the purge gas and diminishing the chance of a runaway plant if we overshoot on production and the purity falls more rapidly than anticipated. This also shifts the purity profile of the product, by delivering higher purity at the end, allowing for significantly more equalization. Further the vacuum is able to pull the plant to a lower pressure than normal, decreasing bed temperature slightly and residual $N_2$ loading slightly. All this adds to significantly higher $N_2$ working capacity and stabilized plant performance. It should be noted that stability benefits are demonstrated for all purities and BSF sizes however a large BSF (>500 lbs/stpd), also demonstrated by model data shows, a 4% production increase and a 6% power decrease over the traditional cycle, and pilot performance data showing up to 8% production increase at an equivalent plant power.

FIG. 5 is a compilation of the product purity obtained at the product header in the modeling environment for the different cases of: >90% production, a Schaub cycle at 80% product purity, a Schaub cycle starting at <80% purity attempting to rise to 80% purity and the cycle proposed here at 80% purity demonstrating the rising tendency of the end of the product make step and the lowering tendency of the start of the product make step.

Figure 6:
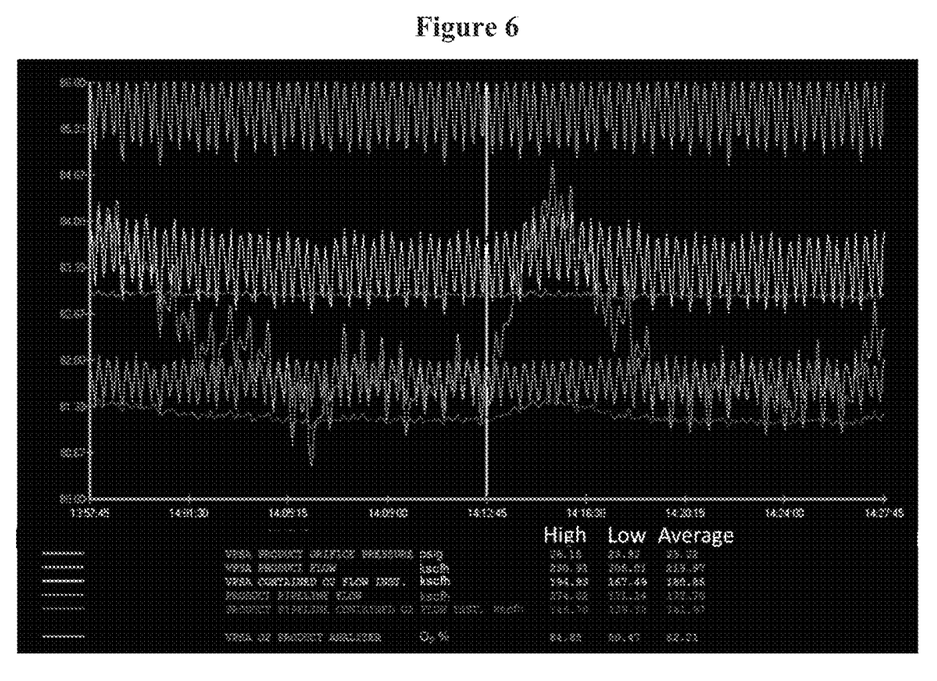
FIG. 6 shows field performance data at steady operation at 80% purity with the modification to the purge and a chart that shows purity swings at steady plant product draw, steady plant production and varying product $O_2$ concentration from 80% up to 85% and back to 80% all within the course of 30 minutes.

The field performance data showed steady operation at 80% purity with the modification to the purge and a chart that shows purity swings without this change is in FIG. 6. The figure shows steady plant product draw, steady plant production and varying product $O_2$ concentration from 80% up to 85% and back to 80% all within the course of 30 minutes.

The process of the invention can be implemented in a PSA/VSA/VPSA cycle, the exception being the free air modification that can only be used in a VSA/VPSA cycle. The desired low pressure is >0.1 atm and the desired high pressure is <100 atm. Even more preferred is a low pressure in the cycle that is >0.3 atm and a high pressure in the cycle that is <6 atm. Aspects of the process such as the free air inlet can be implemented in higher purity cycles as well, from 85% up to 95% in addition to the 50-85% purity mentioned.

The process of claim 17 can comprise a single bed, two beds in a single train, wherein one bed is in feed mode while the other bed is in regeneration mode, or multiple beds beyond two beds.

A variety of adsorbents can be used in the process of the invention. In one embodiment a LiX adsorbent can be used. In another embodiment any faujasite type with any cation of Li, Ca, Na, K or mixed cation configuration can be employed. This invention will work with both high rate adsorbents defined as a mass transfer coefficient of >=12/s and an intrinsic $N_2$ diffusivity of $3.5 \times 10^{-6}$ m$^2$/s at 1.5 bar and 300k, and low rate adsorbents with mass transfer coefficients <12/s and intrinsic N2 diffusivity of less than $3.5 \times 10^{-6}$ m$^2$/s when measured at 1.5 bar and 300K.

We claim:

1. An adsorption process for the production of mid-range purity oxygen from a feed gas containing at least oxygen and nitrogen which comprises continuously feeding the feed gas into a feed input end of an adsorber bed containing at least one nitrogen selective adsorbent which preferentially adsorbs nitrogen and withdrawing oxygen from an exit end of said adsorber bed in a 14 step cycle following the cycle chart:

| STEP | | | | | | | | | | | | | |
|---|---|---|---|---|---|---|---|---|---|---|---|---|---|
| 1 | 2 | 3 | 4 | 5 | 6 | 7 | 8 | 9 | 10 | 11 | 12 | 13 | 14 |
| C/AI | C | C/P | C/P PPG | C/P | EQDN | EQDN/ V | V | V | V | PPG V | V | EQUP V | EQUP C | wherein C: Compressor/Pressurization, AI: Ambient Air Inlet, P: Product make/production/Adsorption, PPG: Provide Purge, V: Vacuum, EQUP: Equalize Up, EQDN: Equalize Down, and wherein the provide purge step 4 of the cycle is stopped prior to stopping product make.

2. The process of claim 1 wherein the adsorber bed is pressurized to said adsorption pressure by pressurized feed gas and with no product pressurization.

3. The process of claim 1 wherein the equalization steps in the cycle are each less than or equal to 1.5 seconds.

4. The process of claim 3 wherein the equalization steps in the cycle ranges from about 0.5 to about 1.25 seconds.

5. The process of claim 1 wherein said mid-range oxygen has an average purity of from about 75% to less than about 90%.

6. The process of claim 2 wherein said mid-range oxygen has an average purity of from about 75% to about 85%.

7. The process of claim 1 wherein said nitrogen selective adsorbent is a high rate adsorbent or a low rate adsorbent and comprises at least one of LiX zeolite, 5A, 13X, CaX, and mixed cation zeolites.

8. The process of claim 1 wherein the highest adsorption pressure is in the range of about 100 kPa to about 2000 kPa, and the lowest desorption pressure is in the range of from about 20 kPa to about 100 kPa.

9. The process of claim 1 which comprises two or more adsorbent beds wherein each bed contains at least one nitrogen selective adsorbent.

10. An adsorption process for the production of mid-range purity oxygen from a feed gas containing at least oxygen and nitrogen which comprises continuously feeding the feed gas into a feed input end of an adsorber bed containing at least one nitrogen selective adsorbent which preferentially adsorbs nitrogen and withdrawing oxygen from an exit end of said adsorber bed in a 14 step cycle, wherein provide purge in the bed undergoing product make is stopped prior to stopping product make.

11. The process of claim 10 which comprises a single bed, or two beds in a single train, wherein one bed is in feed mode while the other bed is in regeneration mode.

12. The process of claim 10 wherein the adsorber bed is pressurized to said adsorption pressure by pressurized feed gas and with no product pressurization.

13. The process of claim 10 wherein said mid-range oxygen has an average purity of from about 75% to less than about 90%.

14. The process of claim 13 wherein said mid-range oxygen has an average purity of from about 75% to about 85%.

15. The process of claim 10 wherein said nitrogen selective adsorbent is a high rate adsorbent or a low rate adsorbent and comprises at least one of LiX zeolite, 5A, 13X, CaX, and mixed cation zeolites.

16. The process of claim 10 wherein the highest adsorption pressure is in the range of about 100 kPa to about 2000 kPa, and the lowest desorption pressure is in the range of from about 20 kPa to about 100 kPa.

17. An adsorption process for the production of mid-range purity oxygen having a purity of less than or equal to 75% from a feed gas containing at least oxygen and nitrogen, said process comprising continuously feeding the feed gas into a feed input end of an adsorber bed containing at least one nitrogen selective adsorbent which preferentially adsorbs nitrogen and withdrawing oxygen from an exit end of said adsorber bed in a 12 step cycle following the cycle chart:

| STEP | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| C/AI | C | C/P | C/P/PPG | C/P | EQDN | V | V | V | PPG/V | V | EQUP/V | wherein C: Compressor/Pressurization, AI: Ambient Air Inlet, P: Product production/Adsorption, PPG: Provide Purge, V: Vacuum, EQUP: Equalize Up, EQDN: Equalize Down, and wherein provide purge in step 4 is stopped prior to stopping product make.

18. The process of claim 17 which comprises a single bed, or two beds in a single train, wherein one bed is in feed mode while the other bed is in regeneration mode.

19. The process of claim 1 wherein the equalization steps is the cycle are each less than or equal to 1.5 seconds.

20. The process of claim 3 wherein the equalization steps in the cycle ranges from about 0.5 to about 1.25 seconds.

21. The process of claim 17 wherein said nitrogen selective adsorbent comprises at least one of LiX zeolite, 5A, 13X, CaX, and mixed cation zeolites.

22. The process of claim 17 wherein the highest adsorption pressure is in the range of about 100 kPa to about 2000 kPa, and the lowest desorption pressure is in the range of from about 20 kPa to about 100 kPa.

* * * * *